United States Patent [19]

Bookbinder et al.

[11] Patent Number: 5,450,513
[45] Date of Patent: Sep. 12, 1995

[54] SILANE-TREATED OPTICAL COMPONENTS

[75] Inventors: Dana C. Bookbinder, Corning; Lung-ming Wu, Horseheads, both of N.Y.

[73] Assignee: Corning Incorporated, Corning, N.Y.

[21] Appl. No.: 352,932

[22] Filed: Dec. 8, 1994

Related U.S. Application Data

[63] Continuation of Ser. No. 101,998, Aug. 4, 1993, abandoned.

[51] Int. Cl.⁶ .............................................. G02B 6/26
[52] U.S. Cl. .................................. 385/48; 385/96; 385/99
[58] Field of Search ............... 65/4.2, 4.21, 409, 430, 65/432, 43; 385/43, 46, 48, 85, 102, 127, 134, 145, 128

[56] References Cited

U.S. PATENT DOCUMENTS

| | | | |
|---|---|---|---|
| 3,341,399 | 9/1967 | Hazdra et al. | 428/429 |
| 3,702,783 | 11/1972 | Hartlein | 427/215 |
| 4,227,950 | 10/1980 | Spycher | 156/85 |
| 4,290,668 | 9/1981 | Ellis | 385/85 |
| 4,679,918 | 7/1987 | Ace | 351/163 |
| 4,683,153 | 7/1987 | Goepfert et al. | 428/1 |
| 4,683,168 | 7/1987 | Hares et al. | 428/335 |
| 4,793,703 | 12/1988 | Fretz, Jr. | 351/163 |
| 4,931,076 | 6/1990 | Berkey | 65/4.2 |
| 4,943,130 | 7/1990 | Dannoux et al. | 385/14 |
| 4,977,028 | 12/1990 | Goepfert et al. | 428/426 |
| 5,009,692 | 4/1991 | Miller et al. | 65/4.21 |
| 5,011,251 | 4/1991 | Miller et al. | 385/43 |
| 5,090,793 | 2/1992 | Seike et al. | 385/134 |
| 5,090,793 | 2/1992 | Seike et al. | 385/134 |
| 5,091,053 | 2/1992 | Blonder et al. | 156/657 |
| 5,155,788 | 10/1992 | Chapin et al. | 385/102 |

OTHER PUBLICATIONS

Chemical Abstracts, vol. 54, No. 9/10 (1975).

*Primary Examiner*—Rodney B. Bovernick
*Assistant Examiner*—John Ngo
*Attorney, Agent, or Firm*—K. McNeill Taylor, Jr.; Jay M. Brown

[57] ABSTRACT

The present invention relates to an optical fiber component, which includes an optical component, (e.g., a glass tube), one or more glass optical fibers attached to the surface of said component, and a surface pretreatment layer, formed from a silane applied to the surfaces of the component and the one or more glass optical fibers. Preferably, an adhesive is applied over the surface pretreatment layer to strengthen attachment of the component to the one or more glass optical fibers. A method of preparing such optical fiber components is also disclosed.

20 Claims, 3 Drawing Sheets

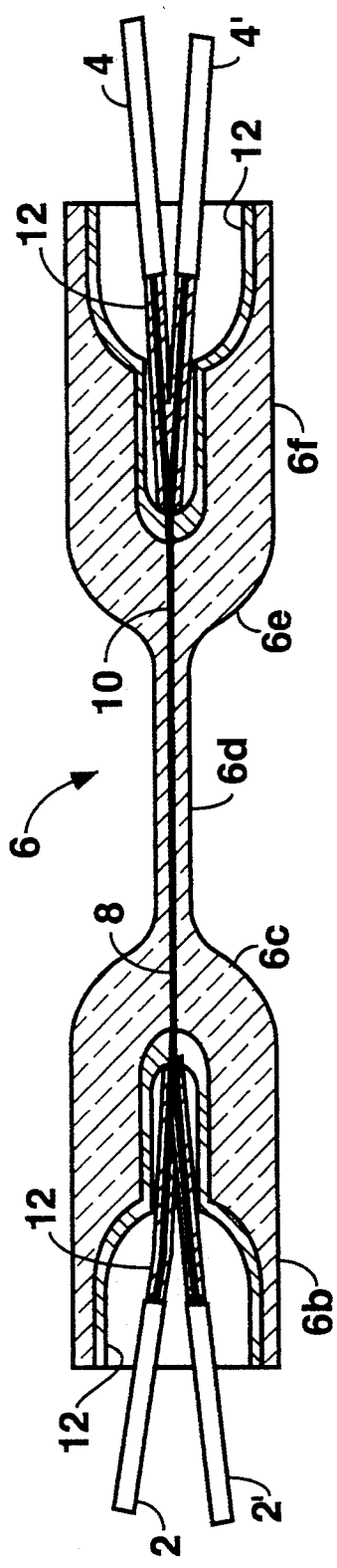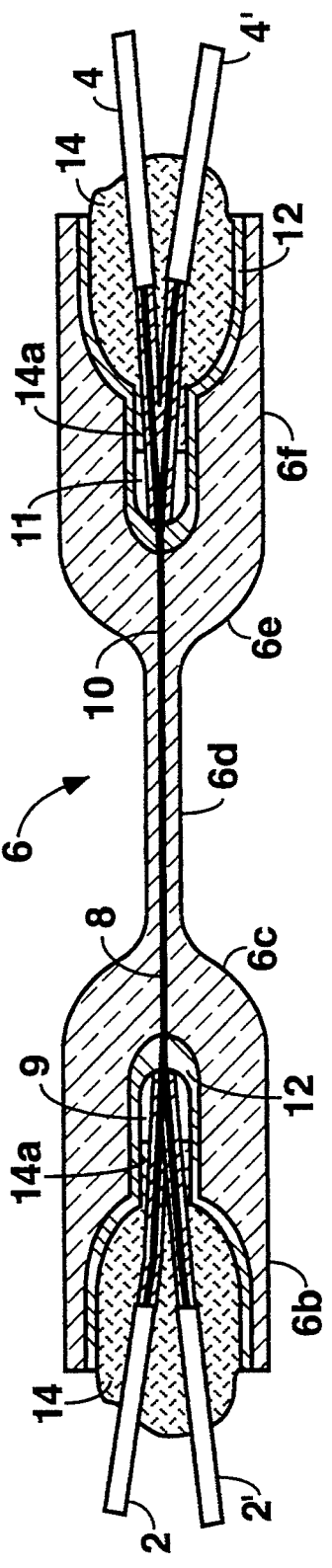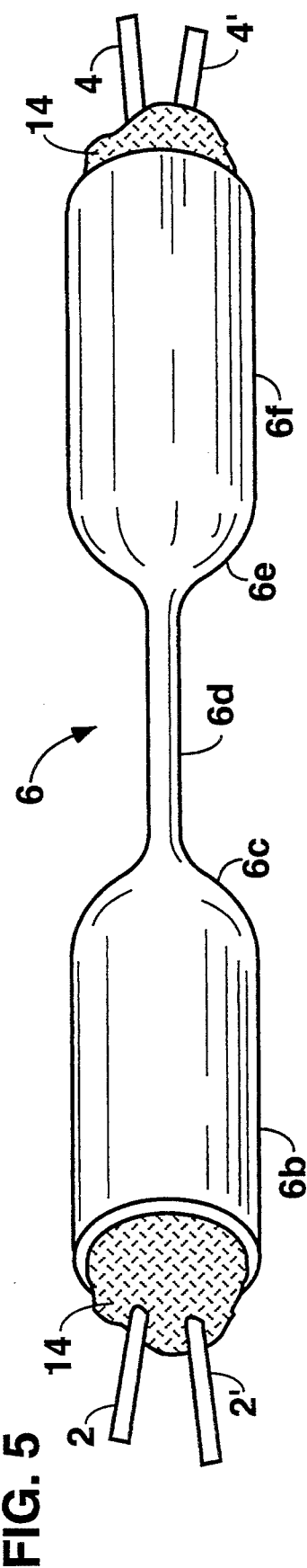

SILANE-TREATED OPTICAL COMPONENTS

This is a continuation of application Ser. No. 08/101,998, filed on Aug. 4, 1993, now abandoned.

FIELD OF THE INVENTION

The present invention relates to optical components having optical fiber pigtails, with improved optical attachment between the optical fibers and the component surface.

BACKGROUND OF THE INVENTION

Optical waveguide components, such as couplers, of various constructions are well known and in widespread use, especially in the telecommunications field. Generally, optical waveguide couplers make it possible to interconnect individual optical waveguide fibers so that the modulated light propagating through an input optical fiber pigtail leading to the optical waveguide coupler continues to propagate through at least one output optical fiber pigtail leading from the optical waveguide coupler. In some optical waveguide couplers, at least two input optical waveguides are coupled within the optical waveguide coupler so that the output light signal is a combination of the input light signals. Examples of optical waveguide couplers are disclosed by U.S. Pat. No. 4,902,324 to Miller et al., U.S. Pat. No. 4,931,076 to Berkey, U.S. Pat. No. 4,948,217 to Keck et al., U.S. Pat. No. 4,943,130 to Dannoux et al., U.S. Pat. No. 5,009,692 to Miller et al., and U.S. Pat. No. 5,011,251 to Miller et al.

Generally, optical fibers used in coupler fabrication have a core, a cladding surrounding the core, and a coating around the cladding. Such fibers are treated to remove the coating (e.g., by mechanical stripping) where the coupling between the optical fibers is to be formed. In fabricating one type of coupler, called a multiclad fused taper coupler, the stripped portions of the optical fibers are positioned inside a hollow glass tube after being inserted into funnels formed at the ends of the glass tube. The central portion of the tube is then heated to collapse it around the optical fibers and drawn to create coupling between the two fibers. The tube thus includes a drawn region joining a pair of tapered regions each leading to a funnel. The optical fibers extend out of the coupler at wide ends of the funnels. The fibers themselves are tapered in the exit regions between the tapered regions and the funnels.

To strengthen the attachment of the optical fibers to the coupler tube, an adhesive is injected into the funnels at their wide ends to bond the optical fibers to the tube. A wide variety of adhesives can be utilized for this purpose. However, an ultraviolet radiation curable epoxy is preferred, because it can be cured rapidly, permitting more efficient manufacture of the coupler.

Other glass components utilize discrete optical fiber pigtails attached to a surface of the optical component with the end face of the optical fiber aligned with a corresponding optical waveguide output in the optical component (see, e.g. Dannoux et al. U.S. Pat. No. 4,943,130). For these components the adhesive may provide the only attachment between the optical component and the optical fiber pigtail.

Despite the preference for epoxy adhesives, optical components treated with this adhesive are still susceptible to adhesive delamination when exposed to humidity or dry thermal cycling. It is believed that such environmental conditions cause delamination due to disruption of the Vander-Waals forces which bond the epoxy to the glass surfaces of both the optical fibers and the coupler tube. The resulting weakened attachment of the optical fibers to the tube has the potential to affect adversely the coupler's performance. Thus, despite the use of adhesives, the need remains for a technique of firmly bonding the optical fibers to the component surface even under hot and/or humid conditions. This is especially true for multiclad couplers where the tapered fibers are susceptible to movement and breakage.

It is known in the art to include silane in the acrylate adhesive composition used to attach optical fibers to the surfaces of substrates with ion-exchanged optical waveguides incorporated therein. Such devices are described in Dannoux U.S. Pat. No. 4,943,130. Howevers, in some cases this method of altering the glue composition is not sufficient to ensure the attachment of the optical fibers to the substrate during environmental changes, especially in the presence of damp heat.

SUMMARY OF THE INVENTION

The present invention relates to an optical fiber assembly (e.g., a coupler) which includes a component with an inorganic surface (e.g., a glass coupler body), one or more glass optical fibers attached to the component, and a surface pretreatment layer formed from a silane applied to the surface of the component, and optionally, to the surfaces of the one or more glass optical fibers. The surface pretreatment layer provides a base for subsequent application of an adhesive to strengthen the attachment of the component to the one or more glass optical fibers via the adhesive. The use of a surface pretreatment layer enables the resulting optical fiber assembly to withstand high humidity and/or temperature without delamination of the adhesive from the treated surface.

Another aspect of the present invention relates to a method of strengthening the attachment, in an optical fiber assembly (e.g., a coupler), of a component with an inorganic surface (e.g., a glass coupler body) to one or more glass optical fibers. In essence, this method calls for providing an optical fiber assembly which includes a component attached to one or more glass optical fibers. A silane is then applied to the optical fiber assembly to form a surface pretreatment layer on the surfaces of the component and the glass optical fibers. In some embodiments, the surface pretreatment layer fills the space between the component surface and the fibers for a portion of the assembly. In addition, in other portions of the assembly, an adhesive can then be applied over the glass surface pretreatment layer in order to achieve better attachment of the one or more optical fibers to the component.

DESCRIPTION OF THE DRAWINGS

FIG. 3 is a cross-sectional view of an optical fiber coupler after silane pretreatment in accordance with the present invention.

FIG. 4 is a cross-sectional view of an optical fiber coupler after application of an adhesive in accordance with the present invention.

FIG. 5 is a perspective view of the optical fiber coupler of FIG. 4.

DETAILED DESCRIPTION OF THE DRAWINGS

The present invention relates to an optical fiber assembly (e.g., a coupler) which includes a component with an inorganic surface (e.g., a glass coupler body), one or more glass optical fibers attached to the component, and a surface pretreatment layer formed from a silane applied to the surface of the glass component, and optionally to the surfaces of the one or more glass optical fibers. An adhesive can be applied over the surface pretreatment layer to strengthen attachment of the component to the one or more glass optical fibers.

Another aspect of the present invention relates to a method of strengthening the attachment of a component with an inorganic surface (e.g., a glass coupler body) to one or more glass optical fibers. This process involves first providing an optical fiber assembly (e.g., a coupler) with a component attached to one or more glass optical fibers. A silane is then applied to the optical fiber assembly to form a surface pretreatment layer on the surfaces of the component and the one or more glass optical fibers. An adhesive can be subsequently applied over the surface pretreatment layer.

Figure 1:
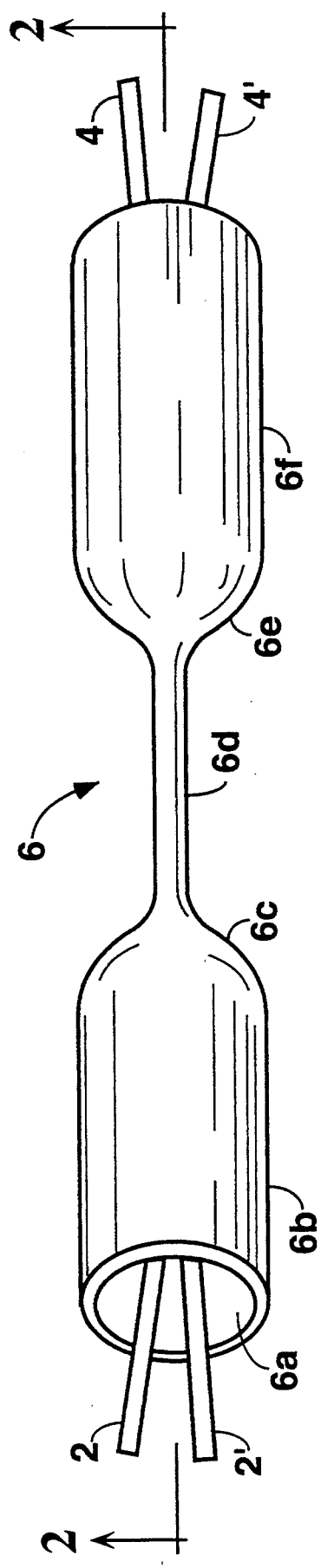
FIG. 1 is a perspective view of an optical fiber coupler prior to silane pretreatment and injection of adhesive, in accordance with the present invention.
Figure 2:
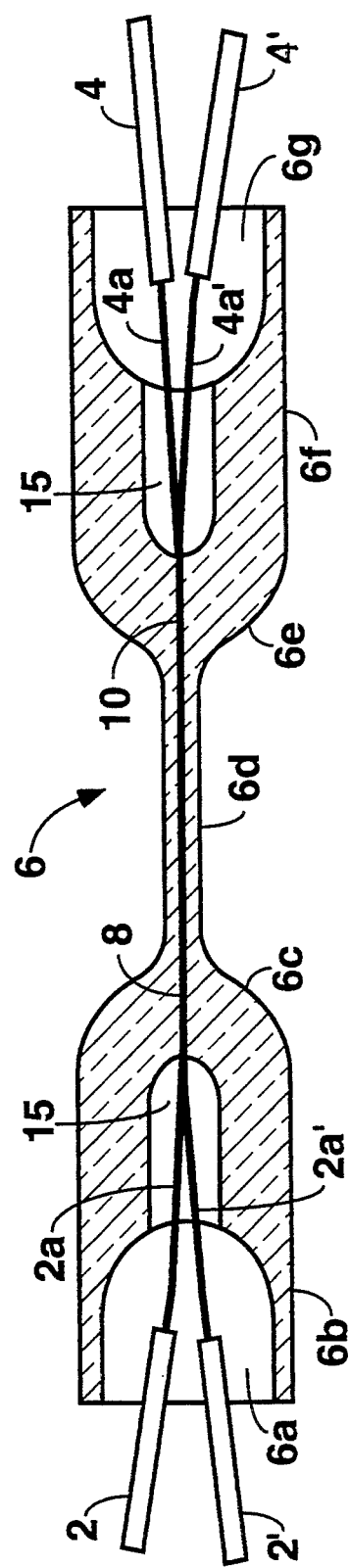
FIG. 2 is a cross-sectional view taken along line 2—2 of FIG. 1.

FIG. 1 is a perspective view of an optical fiber coupler prior to silane pretreatment and injection of adhesive, while FIG. 2 is a cross-sectional view taken along line 2—2 of FIG. 1. As shown, the multiclad coupler operates to couple light between coated optical fibers 2 and 2' and 4 and 4'. The coupler includes tube 6 which is provided with funnel areas 6a and 6g within barrel sections 6b and 6f, respectively, tapered sections 6c and 6e, and fused section 6d. As is well-known in the art, the attached relationship between optical fibers 2 and 2' and 4 and 4' and tube 6, as depicted in FIGS. 1 and 2, is carried out by first removing the polymeric coating surrounding optical fibers 2 and 2' and 4 and 4' to expose cladded cores in the midsections of the fibers which are to be positioned in the coupler tube intermediate funnel areas 6a and 6g. The uncovered portions 2a and 2a', of coated optical fibers 2 and 2' are maintained in proximity as are the uncovered portions 4a and 4a' of coated optical fibers 4 and 4'. The fibers are inserted into a hollow tube precursor of tube 6 which is heated at a central location and drawn to form fused section 6d and tapered sections 6c and 6e where cladded core region 8 joining uncovered optical fiber portions 2a and 2a' and cladded core region 10 joining uncovered optical fiber portions 4a and 4a', respectively, are in optically communicating relationship with one another. This process is fully discussed in U.S. Pat. Nos. 4,931,076 to Berkey and 5,009,692 to Miller et. al., which are hereby incorporated by reference.

FIGS. 1 and 2 (as well as FIGS. 3 to 5) show a 2×2 coupler. However, the present invention is also useful in conjunction with a 1×N (e.g., 1×2) coupler.

Tube 6 should have a softening temperature lower than that of optical fibers 2, 2' 4 and 4'. Suitable tube compositions are $SiO_2$ glass doped with 1 to 25 wt % $B_2O_3$ and $SiO_2$ doped with 0.1 to 2.5 wt % fluorine. A preferred composition is borosilicate glass comprising $SiO_2$ doped with 8–10 wt % $B_2O_3$. In addition to lowering the softening point temperature of $SiO_2$, $B_2O_3$ and F also advantageously decrease the refractive index of coupler 6. See U.S. Pat. No. 4,931,076 to Miller which is hereby incorporated by reference.

Uncovered optical fiber portions 2a and 2a' and 4a and 4a' each have a core and a cladding, which are joined together as noted above to form cladded core regions 8 and 10, respectively. The optical fiber core is formed from a light transmissible material, while the optical fiber cladding has a refractive index below that of the core in order to provide waveguiding of light signals launched into the core. A protective coating surrounds the cladding and core of the optical fiber. Suitable materials for the core, cladding, and coating are well-known in the art.

FIG. 3 is a cross-sectional view of an optical fiber coupler after surface pretreatment in accordance with the present invention. Surface pretreatment layer 12 is formed by injecting silane liquid into funnel areas 6a and 6g of tube 6, usually with a syringe to insure precise placement of material. Silane serves to enhance the adhesion between a hydroxylated inorganic material (e.g., glass exposed to moisture) and an adhesive material (see infra). As a result, surface pretreatment layer 12 covers the surfaces of funnel sections 6a and 6g, as well as the exterior of uncovered optical fiber portions 2a and 2a' and 4a and 4a'.

In addition, the surface layer covers the surfaces of the bores 15 and the optical fiber exteriors within these bores. In these bore regions, the surface pretreatment layer strengthens the attachment of the fibers to the bore surfaces as the fibers exit from tapered sections 6c and 6e. In these exit regions 9 and 11, the fibers themselves are tapered and may be partially fused, or "tacked" to the surface of the bore. These tapered and tacked fiber sections are fragile and sensitive to crack initiation and breakage when a pull force is applied to the fiber pigtail. The silane surface pretreatment acts to strengthen this fragile attachment in the exit regions, even prior to the application of adhesive. In a preferred embodiment, the adhesive is prevented from entering exit regions 9 and 11 while being applied in the bore regions adjacent funnels 6a and 6g (indicated by adhesive region 14a in FIG. 4). This can be accomplished, for example, by illuminating the intersections between exit regions 9 and 11 and adhesive regions 14a with UV light during the application of the UV curable epoxy 14/14a. This precise application of UV curable epoxy is described in copending U.S. patent application Ser. No. 07/972,417 filed by Miller et al. on Nov. 5, 1992 and assigned to the Assignee of the present application, and its disclosure is hereby incorporated in the present application and made a part hereof.

In accordance with one embodiment of the present invention, the silane utilized to form the pretreatment layer has a pH of up to 7. Silanes which meet this criterion include epoxy silanes, acrylate silanes, hydroxy silanes, sulfide silanes, chloroalkyl silanes, and mixtures thereof. Epoxy silanes are particularly preferred. Suitable epoxy silanes include 3-glycidoxypropyltrimethoxy silane sold by Dow Corning Corp., Midland, Mich. as DOW CORNINGA ® Silane Coupling Agent Z-6040 and by Union Carbide Corporation, New York, N.Y. as UNION CARBIDE ® Silane Coupling Agent A-187. Also suitable is β-3,4-epoxycyclohexyl-ethyltrimethoxysilane which is commercially available as UNION CARBIDE ® Silane Coupling Agent A-186.

Suitable acrylate silanes include γ-methacryloxypropyltrimethoxysilane. This material is available as DOW CORNING ® Silane Coupling Agent Z-6030 and as UNION CARBIDE ® Silane Coupling Agent A-174. 3-acryloxypropyltrimethoxysilane is available from Huls America Corp., Bristol, Pa. as Silane Coupling Agent A-0396.

Suitable hydroxy silanes include HO—CH$_2$Si(OCH$_3$)$_3$ and HO—(CH$_2$)$_3$—SiOCH$_3$. The former is available from Huls America Corp., as Silane Coupling Agent T-3635.

A suitable sulfide silane is 3-mercaptopropyltrimethylsilane which is available from Huls America Corp. as Silane Coupling Agent M-8500.

A suitable chloroalkyl silane is 3-chloropropyltrimethoxy silane which is available as CORNING ® Silane Coupling Agent Z-6076.

When utilizing silanes having a pH of up to 7, the silane is applied to the optical installation in the form of a liquid containing $1.0 \times 10^{-6}$ to 10.0 wt % silane, 0 to 5.0 wt % catalyst activator, 0.1 to 95 wt % water, and the remainder an alcohol. The catalyst activator can be any acid or base which will activate the silane and, as a result, promote covalent bonding (discussed infra) between the silanol and the glass surfaces of tube 6 and optical fibers 2 and 2' and 4 and 4'. This activation step proceeds according to the following equation:

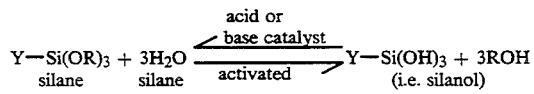

Y is a functional group ( e.g., epoxy, acrylate, hydroxy, sulfide, chloro, etc, groups ) and R is an alkyl group Suitable acids include acetic acid, inorganic acids like hydrochloric acid, and mixtures thereof. Bases useful as catalyst activators include sodium hydroxide, ammonia, alkyl ammonium compounds like trimethylamine and triethylamine, and mixtures thereof. The alcohol preferably has 1 to 8 carbon atoms and is preferentially utilized instead of water, because alcohol has good wetting properties and can be dried quickly.

In an alternative embodiment of the present invention, the silane utilized has a pH of above 7. Suitable silanes include amino silanes, styrylamine silanes, and mixtures thereof. The use of silanes with a pH of above 7 is advantageous, because they are self-activating, unlike silanes having a pH of up to 7.

Suitable amino silanes include N-(2-aminoethyl)-3-aminopropyltrimethoxysilane which is available as DOW CORNING ® Silane Coupling Agent Z-6020 and as UNION CARBIDE ® Silane Coupling Agent A-1120. Alternatively, γ-aminopropyltriethoxysilane, available as UNION CARBIDE ® Silane Coupling Agent A-1100 can be utilized.

Styrylamine silanes suitable for use in the present invention include N-(2-(vinylbenzylamino)-ethyl)-3-aminopropyltrimethoxysilane which is available as DOW CORNING ® Silane Coupling Agent Z-6032. Alternatively, aminophenyl trimethoxysilane, which is sold by Huls America Corp. as Silane Coupling Agent A-0725, can be utilized.

Since silanes having a pH above 7 are self-activating, no catalyst activator is needed. However, such silanes should still be applied to couplers in a liquid form similar to that used for silanes having a pH of up to 7.

For silanes having a pH above 7, it is necessary to utilize an acid to reduce the pH of the silane to 7 or below. Such acids can be organic acids having 1 to 8 carbon atoms, including mixtures thereof. Alternatively, inorganic acids like phosphoric acid., sulfuric acid, hydrochloric acid, and mixtures thereof are useful. These acids can either be applied with the silane to the optical installation, applied with the adhesive, applied between application of the silane and application of the adhesive, or be applied through combinations of such acid applications. If such acids are not utilized when silanes having a pH above 7 are employed, the silane will neutralize the UV-initiator in the subsequently-added epoxy adhesive by eliminating the acidic conditions required for epoxy curing. As a result, the adhesive will not cure or bond through glass surface pretreatment layer 12 to tube 6 or to the uncovered optical fiber portions 2a and 2a' and 4a and 4a'.

Regardless of what type of silane is selected to form surface pretreatment layer 12 (i.e., silanes with a pH of up to 7 or silanes with a pH above 7), components treated with the above-described silane solutions should be allowed to sit for a period of 30 seconds to 2 hours and then subjected to heating to dry the solution and cure the silane. Suitable heating conditions are 80° to 160° C., preferably 100°-150° C., for a time period of 10 seconds to 30 minutes, preferably 1 minute. As a result of such heating, it is believed that the silane covalently bonds to the glass surfaces of tube 6 and the uncovered optical fiber portions 2a and 2a' and 4a and 4a' in accordance with the following reaction:

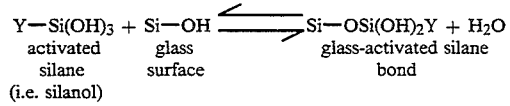

Y is a functional group (e.g., epoxy, acrylate, hydroxy, sulfide, chloro, etc., groups) and R is an alkyl group.

Alternatively, where the silane has not been fully activated, the following reaction would govern covalent bonding between the silane and the glass surfaces of tube 6 and optical fibers 2 and 2' and 4 and 4':

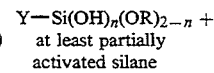

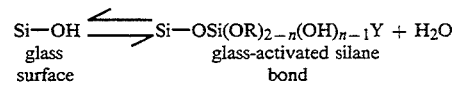

Y is a functional group (e.g., epoxy, acrylate, hydroxy, sulfide, chloro, etc. groups), R is an alkyl group, and n is 1 or 2.

The above described covalent bonding results in a strong chemical adherence between surface pretreatment layer 12 and the glass surfaces of tube 6 and uncovered optical fiber portions 2a and 2a' and 4a and 4a'. This prevents the delamination problems encountered when only an epoxy adhesive is utilized.

FIG. 4 shows a cross-sectional view of an optical fiber coupler after application of an adhesive in accordance with the present invention, while FIG. 5 is a perspective view of the optical fiber coupler of FIG. 4. After glass surface pretreatment layer 12 is applied and heated to achieve the above-described covalent bonding, adhesive 14 can be injected, usually with a syringe, into funnel areas 6a and 6g and bores 15 to reinforce the attachment between tube 6 and optical fibers 2 and 4. Epoxies, particularly ultraviolet radiation curable epoxies, are preferred, although adhesive 14 can be any bonding material such as a cement, a polymeric adhesive, or the like.

Suitable epoxies include cycloaliphatic epoxy resins (e.g., ERL Epoxy Resins, including ERL-4221 (3,4-epoxycyclohexylmethyl-3,4-epoxycyclohexane carboxylate), ERL-4206 (vinylcyclohexane dioxide), ERL-4234 (2-[3,4-epoxycyclohexyl-5,5-spiro-3,4-epoxy)cyclohexane-metadioxane), and ERL-4299 (Bis[3,4-epoxycyclohexyl adipate]), all available from Union Carbide Corp.). Other suitable epoxy resins include EPON® 828 (diglycidylether of Bisphenol-A) and EPONEX® 1510 (diglycidylether of hydrogenated Bisphenol-A), both from Shell Chemical Co., Houston, Tex.

Particularly, preferred epoxies are those that can be cured under ultraviolet radiation by incorporating an ultraviolet radiation initiator with the epoxy. Suitable initiators include UVI-6974 and UVI-6990 CYRACURE®, both available from Union Carbide Corp.

Also useful are epoxy novclaes from Shell Chemical Co. and Dow Chemical Co., Midland, Mich., as well as ELC-2500, ELC-2060, and ELC-2722 epoxy formulations from Electro-Lite Corp., Danbury, Conn., which include UV-initiators.

Acrylates and Methacrylates may also be used as adhesives, for example methylacrylates,, ethylacrylates, butylacrylates, methyl methacrylates, ethylmethacrylates and butylmethacrylates. Particular acrylate formulations with initiators include: 4484 acrylate from Electro-Lite Corp.; 305 urethane acrylate from Dymax Corp., Torrington, Conn.; Prism 401 cyanoacrylate from Loctite Corp., Newington, Conn.; IMPROY 366 acrylate from Loctite Corp.; and, 3603 methacrylate ester from Loctite Corp.

In addition, thermally cured epoxies, with thermal catalysts such as phthalic anhydride and hexamethylene tetraamine may be used, such as FE-0185 from N. B. Fuller, St. Paul, Minn., but such thermally cured epoxies typically have slower curing rates than UV-curable epoxies. For adhesives other than UV curable epoxies, silanes with pH above 7 do not require acid treatment.

Once adhesive 14/14a is injected into funnel areas 6a and 6g and bores 15, it is subjected to ultraviolet radiation in order to cure the epoxy and cause it to bind to surface pretreatment layer 12 overlying the glass surfaces of funnel sections 6a and 6g and uncovered optical fiber portions 2a and 2a' and 4a and 4a'. Depending upon the type of functional ,group attached to the silane, the epoxy will usually form a covalent bond with pretreatment layer 12. However, in some cases the attraction between epoxy adhesive 14 and surface pretreatment layer 12 may result from a polar attraction. After curing with ultraviolet radiation, usually at room temperature, the adhesive is subjected to heat at temperatures of up to 150 C., preferably to 125° C., to complete epoxy curing.

As a result of the present invention, an optical fiber component is formed where the adhesive is resistant to delamination when the coupler is subjected to heat and/or humidity. This maintains a strong adherence between the optical fibers and the optical component surface. Consequently, the system utilizing this optical fiber component is able to operate at high performance.

EXAMPLES

Example 1

A silane solution is prepared by mixing in a plastic bottle 96.4 grams of methanol, 2.0 grams of deionized water, and 0.6 grams of acetic acid. The plastic bottle was then capped and shaken for 5 to 10 seconds to mix the additives. Next, 1.0 grams of 3-glycidoxypropyltrimethoxy silane (Dow Corning® Silane Coupling Agent Z-6040) was added to the bottle. After the bottle was capped and shaken for 15 seconds, it was allowed to sit for 24 hours so that the silane would react with the water and become activated.

One optical fiber, 0.125 mm in diameter, was mechanically stripped to remove the outer organic coating. The stripped portion of the optical fiber was then inserted into a silica glass tube having a length of 32.5 mm, a diameter of 2.6 mm, an axial bore having a diameter of 0.55 mm, and a pair of funnel regions at the ends of the coupler body each having a diameter of 2.2 mm and a length of 2.2 mm. In this example, the assembly was not heated and drawn, but left with original dimensions in order to test the adhesive attachment of the fiber and interior surface of the tube (funnel regions and axial bore).

The silane solution was then injected with a syringe into the funnel regions and bores of the tube at room temperature for 1 minute. The coupler was then heated to 150° C. for 1 minute to dry and provide adhesion of the silane to the glass.

Ultraviolet radiation curable epoxy (ELC-2500 from Electro-lite Corp., Danbury, Conn.) was then injected into the funnel regions of the tube using a 1 cc syringe and a 26 gauge needle. Care was taken to avoid the presence of large bubbles in the epoxy which would hinder good adhesion. The epoxy was then cured by exposure to ultraviolet radiation for 2 minutes, using a Dymax PC-3 ultraviolet light manufactured by Dymax Engineering, Torrington, Conn. After curing, the coupler was heated to 85° C. for 2 hours so that the optical fibers strongly adhered to the tube.

Example 2

The steps of Example 1 were repeated except that the epoxy silane was replaced with 3-methacryloxypropyltrimethoxysilane (DOW CORNING® Silane Coupling Agent Z-6030).

Example 3

The steps of Example 1 were repeated except that the epoxy silane was replaced with N-(2-aminoethyl)-3-aminopropyltrimethoxy silane (DOW CORNING® Silane Coupling Agent Z-6020) and no acetic acid activator was added.

When the ultraviolet radiation curable epoxy was applied to the component, the basic pH of the previously-applied silanes prevented the epoxy from being cured under ultraviolet radiation. As a result, the epoxy was not able to form an adhesive bond with the tube of the component, the optical fiber, or the previously-applied silane. However, the addition of an acid either to the silane, to the epoxy, or by separate application to the component between application of the silane and application of the epoxy would be expected to prevent such neutralization of the ultraviolet radiation curable epoxy initiator.

Example 4

The steps of Example 1 were repeated except that the epoxy silane was replaced with γ-aminopropyltrimethoxysilane (UNION CARBIDE ® Silane Coupling Agent A-1100) and no acetic acid activator was added.

When the ultraviolet radiation curable epoxy was applied to the component, the basic pH of the previously-applied silanes prevented the epoxy from being cured under ultraviolet radiation. As a result, the epoxy was not able to form an adhesive bond with the tube of the component, the optical fiber, or the previously-applied silane. However, the addition of an acid either to the silane, to the epoxy, or by separate application to the component between application of the silane and application of the epoxy would be expected to prevent such neutralization of the ultraviolet radiation curable epoxy initiator.

Example 5

The steps of Example 1 were repeated except that the epoxy silane was replaced with N-(2-(vinylbenzylamino)-ethyl)-3-aminopropyl-trimethoxysilane (DOW CORNING ® Silane Coupling Agent Z-6032) and no acetic acid activator was added.

When the ultraviolet radiation curable epoxy was applied to the component, the basic pH of the previously-applied silanes prevented the epoxy from being cured under ultraviolet radiation. As a result, the epoxy was not able to form an adhesive bond with the tube of the component, the optical fiber, or the previously-applied silane. However, the addition of an acid either to the silane, to the epoxy, or by separate application to the component between application of the silane and application of the epoxy would be expected to prevent such neutralization of the ultraviolet radiation curable epoxy initiator.

Example 6

The optical fiber component of Example 1 was placed in a programmable oven and subjected to thermal cycling from −40° C. to 85° C. for 1 day with 3 complete cycles being carried out each day. Next, the component was placed in an environmental chamber and subjected to a temperature of 85° C. and a relative humidity of 85% for 3 days. Finally, the component was returned to the programmable oven and again subjected to thermal cycling from −40° C. to 85° C. for 1 day with 3 complete cycles being carried out each day.

Figure 6:
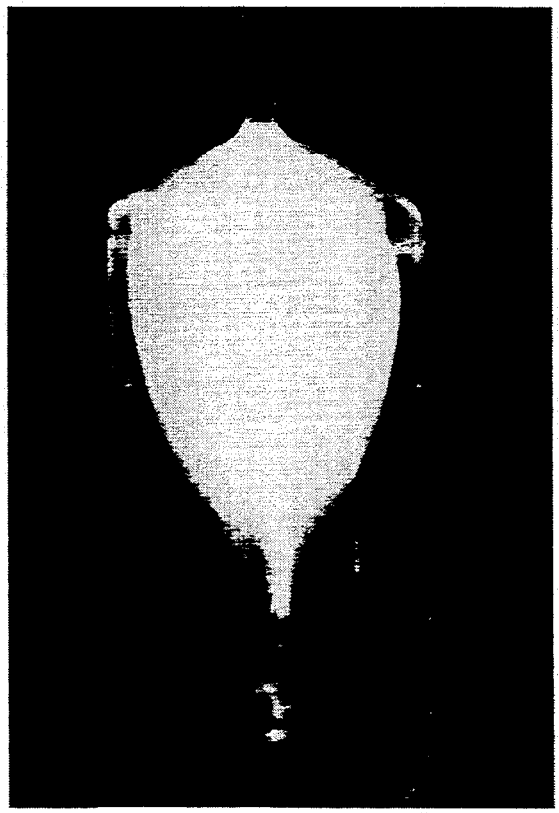
FIG. 6 is a photograph taken through a microscope, at a magnification of 50×, of an optical fiber component in accordance with the present invention.

The component was then placed under a stereo optical microscope and examined for evidence of delamination of the ultraviolet radiation cured epoxy. No delamination between the epoxy and the component was seen, as demonstrated by FIG. 6 which is a photograph taken through a microscope at a 50× magnification. As the ultraviolet radiation cured epoxy is not transparent, it could not be determined whether there was any delamination between that epoxy and the optical fibers.

Figure 7:
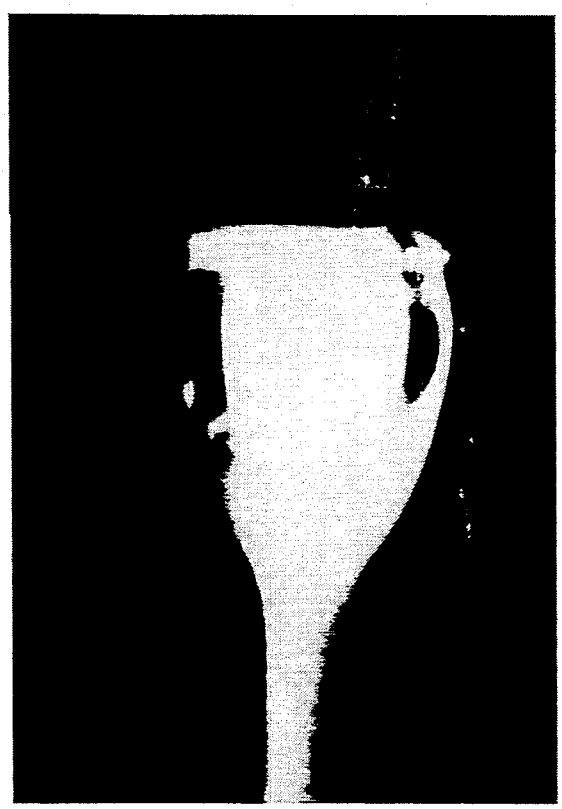
FIG. 7 is a photograph taken through a microscope, at a magnification of 50×, of an optical fiber component prepared by prior art procedures.

This result constitutes a substantial improvement over the prior art process of simply applying an ultraviolet radiation curable epoxy to an optical fiber component without provision for a surface pretreatment layer formed from a silane. The delamination of epoxy adhesives in such prior art processes is apparent from FIG. 7 which is a photograph taken through a microscope, at a 50× magnification, of an optical fiber component prepared in accordance with Example 1 except that no silane was prepared or applied to the optical fiber assembly. More particularly, FIG. 7 shows dark areas inside the funnel which constitute delamination sites.

Similar results have been obtained for 2×2 multiclad couplers as depicted in FIGS. 1-5 which incorporate a fused tapered region. In addition increased strength has been observed in a fiber pull test for such couplers after the surface pretreatment layer has been applied but prior to the addition of adhesive. This is believed to be due to the strengthening effect of silane in the region where a portion of the fiber is tacked to the tube interior (i.e., within exit regions 9 and 11).

Although the invention has been described in detail for the purposes of illustration, it is understood that such detail is made solely for that purpose and variations can be made therein by those skilled in the art without departing from the spirit and scope of the invention which is defined by the following claims.

What is claimed:

1. An optical fiber assembly comprising:
    a glass optical component with an inorganic surface;
    one or more glass optical fibers attached to said inorganic surface; and
    surface pretreatment layer formed from a silane applied to said inorganic surface and a surface of said one or more glass optical fibers.

2. An optical fiber assembly according to claim 1, wherein said optical fiber assembly is a multiclad optical fiber coupler and said component is a glass tube.

3. An optical fiber coupler according to claim 2, wherein the silane has a pH of up to 7.

4. An optical fiber coupler according to claim 3, wherein the silane is selected from the group consisting of epoxy silanes, acrylate silanes, hydroxy silanes, sulfide silanes, chloroalkyl silanes, and mixtures thereof.

5. An optical fiber coupler according to claim 4, wherein the silane is selected from the group consisting of amino silanes, styrylamine silanes, and mixtures thereof.

6. An optical fiber coupler according to claim 4, wherein the silane is treated with an acid selected from the group consisting of organic acids having 1 to 8 carbon atoms, phosphoric acid, sulfuric acid, hydrochloric acid, and mixtures thereof.

7. An optical fiber coupler according to claim 2, wherein said tube comprises:
    a plurality of funnels each having a first end for receiving one or more of said glass optical fibers and
    a fused region connecting said plurality of funnels at an end other than the first end, wherein the silane and said adhesive is applied into the funnel at the first end.

8. An optical fiber coupler according to claim 7, wherein the silane has a pH of up to 7 and said adhesive is an epoxy.

9. An optical fiber assembly comprising:
    a glass optical component;
    a surface pretreatment layer formed from a silane applied to the surface of said component;
    one or more glass optical fibers attached to said component surface by means of an adhesive intermediate said fibers and said surface pretreatment layer.

10. An optical fiber assembly according to claim 9 further comprising a surface pretreatment layer formed from a silane applied to the surfaces of said one or more glass optical fibers.

11. An optical fiber assembly according to claim 9, wherein said silane is an epoxy silane with a pH of up to 7.

12. A method of strengthening the attachment of a glass optical component to one or more glass optical fibers comprising:

providing an optical fiber assembly comprising a glass optical component with an inorganic surface, said glass optical component being attached to surfaces of one or more glass optical fibers; and applying a silane to the optical fiber assembly to form a surface pretreatment layer on the glass optical component inorganic surface and the surfaces of the one or more glass optical fibers.

13. A method according to claim 12 further comprising:

applying an adhesive to the optical fiber assembly over the surface pretreatment layer.

14. A method according to claim 13, wherein the optical fiber assembly is a multiclad optical fiber coupler and the component is a glass tube.

15. A method according to claim 14, wherein the silane has a pH of up to 7.

16. A method according to claim 15, wherein the silane is selected from the group consisting of epoxy silanes, acrylate silanes, hydroxy silanes, sulfide silanes, chloroalkyl silanes, and mixtures thereof.

17. A method according to claim 14, wherein the silane has a pH of above 7 and is selected from the group consisting of amino silanes, styrylamine silanes, and mixtures thereof.

18. A method according to claim 17 further comprising:

treating the silane with an acid selected from the group consisting of organic acids having 1 to 8 carbon atoms, phosphoric acid, sulfuric acid, hydrochloric acid, and mixtures thereof;

wherein said treating is carried out either during said applying the silane, during said applying the adhesive, between said applying the silane and said applying the adhesive, or combinations thereof.

19. A method according to claim 14, wherein said providing an optical fiber coupler comprises:

providing a plurality of glass optical fibers to be joined;

inserting one end of each of the plurality of glass optical fibers into a hollow glass tube; and shrinking the hollow glass tube around the plurality of glass optical fibers and drawing the assembly to form said multiclad coupler.

20. A method according to claim 19, wherein the multiclad coupler comprises:

a plurality of funnels each having a first end for receiving one or more of said glass optical fibers; and a fused region connecting said plurality of funnels at an end other than the first end, wherein the silane and said adhesive is applied into the funnels at the first end.

* * * * *